May 15, 1962 P. J. KIRCHER 3,035,144
THERMOSTATIC SWITCH

Filed July 1, 1960 2 Sheets-Sheet 1

INVENTOR.
PAUL J. KIRCHER
BY
*Lindsey, Prutzman & Hayes*
ATTORNEYS

May 15, 1962   P. J. KIRCHER   3,035,144
THERMOSTATIC SWITCH
Filed July 1, 1960   2 Sheets-Sheet 2
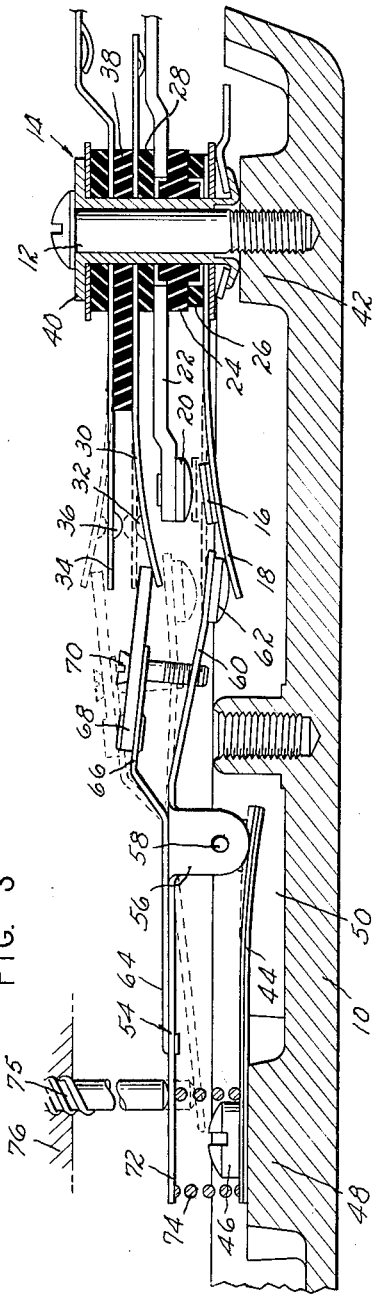
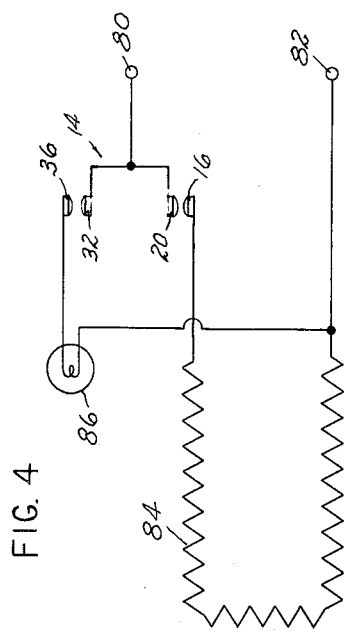
INVENTOR.
PAUL J. KIRCHER
BY
Lindsey, Prutzman & Hayes
ATTORNEYS 3,035,144
Patented May 15, 1962

3,035,144
THERMOSTATIC SWITCH
Paul J. Kircher, Plainville, Conn., assignor to Landers, Frary & Clark, New Britain, Conn., a corporation of Connecticut
Filed July 1, 1960, Ser. No. 40,325
5 Claims. (Cl. 219—25)

This invention relates generally to a thermostatic switch and, more particularly, to a thermostatic switching arrangement for controlling the heating element and temperature indicator circuits of an electrically heated device.

The principal object of this invention is to provide an improved thermostatic switch for controlling the heating element of a device and a temperature indicator circuit so that the indicator shows the true temperature of the controlled device.

A further object of this invention is to provide a thermostatic switch which actuates an indicator circuit of an electrically heated device when the device is at a selected temperature regardless of the direction in which that temperature is approached.

A more specific object of this invention is to provide in an electrically heated device an improved thermostatic switch which controls the temperature of the device and which actuates an indicator only when the device is at the preset temperature.

A still further object of this invention is the provision of a thermostatic switch and indicator control that is economical to manufacture, easy to install and adjust, and reliable in operation.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 3 is similar to FIGS. 1 and 2 and shows the operation of a thermostatic switch embodying the invention when the temperature setting of the steam iron is suddently changed; and FIG. 4 is a schematic diagram showing the contacts of a thermostatic switch embodying this invention and their location in the heating element and indicator lamp circuits of a steam iron.

Figure 1:
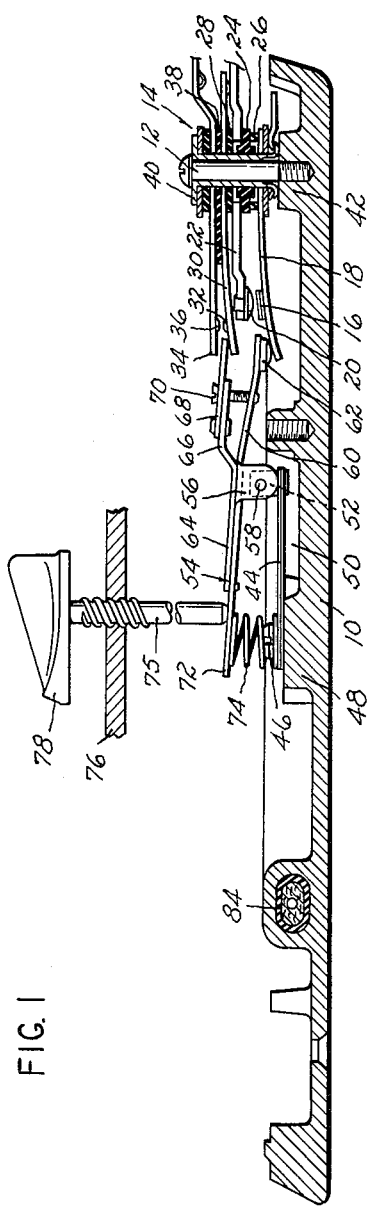
FIG. 1 is a partial cross sectional view of a steam iron in its Off condition and incorporating a thermostatic switch embodying this invention.

In FIG. 1, there is shown a thermostatic switch embodying this invention as incorporated in a steam iron which is only partially shown. Fixed to a sole plate 10 of an electrically heated iron by means of bolt 12 is a contact assembly generally designated 14. This assembly includes a contact 16 mounted on a resilient contact arm 18 and a contact 20 mounted on a rigid contact arm 22 opposite contact 16. Arms 18 and 22 are spaced and electrically insulated from each other by means of insulating blocks 24 and 26. Spaced from contact arm 22 by means of an insulating block 28 is a resilient contact arm 30 carrying a contact 32. Mounted on a resilient arm 34 opposite contact 32 is a contact 36 and insulating block 38 is provided to separate contact arms 30 and 34. The various contact arms and insulating blocks are stacked as shown and formed with aligned openings therein to receive a bushing 40 whose ends are bent over to fasten the aforementioned switch members together and through which bolt 12 passes to fasten the whole contact assembly 14 to a raised should 42 formed in sole plate 10.

A heat responsive bimetallic element 44 is mounted by means of a screw 46 to a raised shoulder 48 formed in sole plate 10. Bimetallic element 44 extends over a recess 50 formed in sole plate 10 so that the free end of element 44 may move vertically in response to temperature variations without engaging sole plate 10.

Secured by any suitable means to the free end of element 44 is a U shaped mounting bracket 52 provided with aligned apertures in the upstanding legs. A rigid switch actuating lever 54 is provided with bent-over legs forming mounting bracket 56 and is pivotally mounted on the free end of bimetal 44 by means of a pin 58 passing through aligned apertures in mounting brackets 52 and 56. The front end 60 of lever 54 carries an insulating button 62 which engages the end of the resilient contact arm 18 to separate the normally closed contacts 16 and 20 as shown in FIG. 1.

Rigidly mounted on the top of actuating lever 54 is an arm 64 which has fastened to its front end 66 an insulating rod 68 which extends between the resilient contact arms 34 and 30. An adjusting screw 70 passes through insulating rod 68 and arm 66 and is threaded in end 60 of actuating lever 54 so that rotation of adjusting screw 70 varies the vertical spacing between insulating button 62 and insulating rod 68 by forcing rod 68 upwardly or downwardly with respect to front end 60.

Disposed between the rear end 72 of actuating lever 54 and the fixed end of bimetal 44 on sole plate shoulder 48 is a biasing spring 74 which urges lever 54 and the various contacts of switch assembly 14 in a position as shown in FIG. 1. Such a position is the Off position of the steam iron since both the indicating lamp and heating element circuits are open (see FIG. 4). The temperature of the steam iron is controlled by means of a temperature selecting shaft 75 which is threadably mounted in the shell or housing 76 of the steam iron and which has manual operating knob 78 fixed to the end thereof. By rotating adjusting shaft 75 so that the shaft advances downwardly, the rear end 72 of actuating lever 54 is forced downwardly against the action of spring 74 thereby rotating actuating lever 54 in a counterclockwise direction about pin 58.

Figure 2:
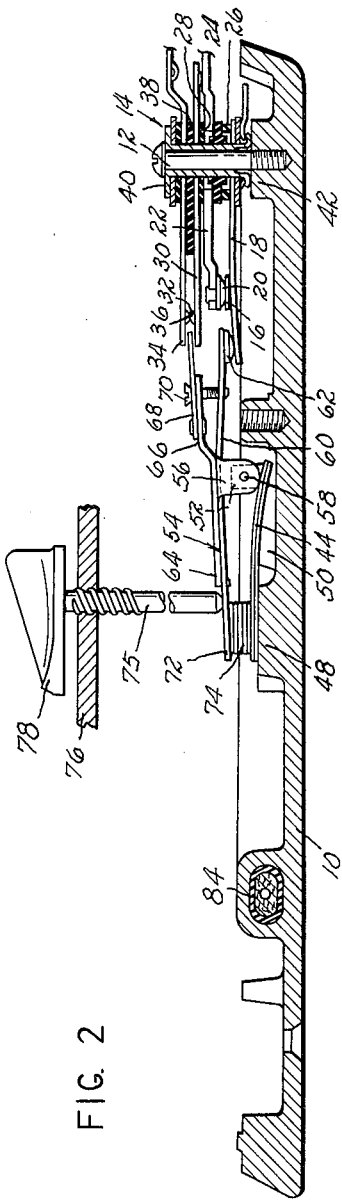
FIG. 2 is similar to FIG. 1 and shows a steam iron in its On condition.

FIG. 2 shows the exact switch assembly illustrated in FIG. 1 in its On condition rather than in the Off condition. In FIG. 2, selecting shaft 75 has been rotated to force the rear end 72 of actuating lever 54 downwardly thereby rotating insulating rod 68 and insulating button 62 upwardly to allow the resilient arms 18 and 30 to resume their normal position in which their respective contacts 16, 20 and 32, 36 are closed.

In FIG. 4 there is shown a schematic diagram of the heating and indicator circuits of the steam iron together with the arrangement of the switch contacts of switch assembly 14. Terminals 80 and 82 are adapted to be connected to a power source. A heating element 84 is connected across terminals 80 and 82 through the switch contacts 16 and 20. An indicator lamp 86 is connected across terminals 80 and 82 through switch contacts 36 and 32.

A description of the operation of the switching arrangement illustrateds in FIGS. 1 and 2 will now be described in conjunction with the circuit diagram of FIG. 4. In FIG. 1, the steam iron is shown in its Off position. In this position, temperature selecting shaft 75 is in its uppermost position so that biasing spring 74 has rotated actuating lever 54 in its extreme clockwise position. In this position, insulating button 62 engages the end of resilient contact arm 18 and forces it downwardly so that the electrical contacts 16 and 20 are separated. Insulating rod 68 is also at its extreme clockwise position and engages and forces downwardly resilient contact arm 30 thereby separating contacts 32 and 16. As shown in FIG. 4, it is obvious that when contacts 16, 20 and 32, 36 are separated, both the heating element and indicator lamp circuits are opened.

In FIG. 2, the iron has been set to its highest temperature, On condition, selecting shaft 75 has forced actuating lever 14 to its extreme counterclockwise position, and sole plate 10 is at the temperature called for by the setting of calibrating rod 75. In this condition, since insulating button 62 and insulating rod 68 have been rotated upwardly, resilient contact arm 18 returns to its normal position so that contacts 16 and 20 are closed and, likewise, contact arm 30 returns to its normal position so that contacts 32 and 36 are closed. The free end of heat responsive element 44 has curved downwardly to a position wherein insulating rod 68 is interposed between contact arms 30 and 38 without engaging either one. Such a condition of bimetal 44 and location of rod 68 exists when the sole plate 10 is at the temperature called for by the setting of selecting shaft 75 regardless of whether or not heating element 84 is energized and regardless of whether the sole plate has been cooled or heated. The spacing of the outer ends of contact arms 30 and 34 is such that normal cycling of bimetal 44 and contacts 16 and 20 to maintain the desired sole plate temperature does not cause insulator 68 to interrupt the indicator light circuit through contacts 32 and 36.

The spacing between insulating rod 68 and the front portion 60 of actuating rod 54 can be changed by means of the adjusting screw 70. The spacing of rod 68 and front end 60 of actuating rod 54 determines at what position of actuating lever 54 the indicator light will be turned on.

FIG. 3 is similar to FIGS. 1 and 2 in that it shows an abbreviated portion of sole plate 10 incorporating a thermostatic switching arrangement embodying this invention. Since the switch structures of FIGS. 1 and 2 are identical, the same reference numerals have been used to identify corresponding parts. The solid line position of the switch in FIG. 3 shows the relative positions of the parts when the selecting shaft 75 has been suddenly changed from a high temperature setting to a lower temperature setting. The dotted line positions show the condition of the parts when shaft 75 has been suddenly changed from a low temperature setting to a high temperature setting. In both cases, it will be noted that contacts 32 and 36 are separated and indicator lamp 86 is Off.

Let us first consider the solid line position of the parts and assume that the setting of the iron and the relative parts of the switching arrangements were initially as shown in FIG. 2, i.e., the iron is in its On position with the heating element 84 and lamp 86 both energized. The operator then suddenly turns shaft 75 so that the shaft moves upwardly, thereby calling for a lower temperature of the sole plate 10. Since the rotational movement of actuating lever 54 is independent of its vertical movement caused by the temperature response of bimetal 44, actuating lever 54 will immediately pivot in a clockwise direction. Such a rotation causes insulating button 62 to engage and push downwardly the end of resilient arm 18 thereby separating the contacts 16 and 20. In like manner, insulating rod 68 engages and forces downwardly resilient contact arm 30 to separate contacts 32 and 36. Therefore, as shown in FIG. 3, both the indicator lamp and the heating element circuits are open and deenergized. This position of the switch contacts indicates that the steam iron is not at its set temperature since the indicator lamp is off and also that the actual temperature of the sole plate is too high since the heating element circuit is also deenergized. This position of the contacts is somewhat similar to that shown in FIG. 1 except that in the Off position in FIG. 1 the bimetal 44 is cold and is therefore in its normal horizontal position. At the same time, however, the temperature selecting shaft 75 is in its uppermost position which is not necessarily the case in the solid line position of FIG. 3. However, the resulting position of the switch contacts is the same since the combined effects of the vertical position of the free end of bimetal 44 and the rotational position of actuating arm 54 are the same in both cases.

In the dotted line position of FIG. 3, let it be assumed that the position of the parts was initially as shown in FIG. 1 with the iron in its Off position and shaft 75 is suddenly rotated to turn the iron On. It is, of course, to be understood that it is not necessary that the iron initially be Off but only that shaft 75 be suddenly turned from a low temperature setting to a higher temperature setting. In this case, shaft 75 forces the rear end 72 of actuating lever 54 downwardly so that actuating lever 54 is rotated in a counterclockwise direction immediately. Consequently, insulating button 62 is rotated upwardly to allow contacts 16 and 20 to close. As shown in FIG. 3, this immediately energizes the heating element 84. However, since the iron is not at the temperature called for by the setting of shaft 75, it is desired that the indicating lamp still not be energized. This result is accomplished since bimetal 44 is still in its lower temperature position and the rotation of actuating lever 54 causes insulating rod 68 to rotate upwardly past the closed position of contacts 32 and 36 and engage the upper resilient arm 34 to once again separate contacts 32 and 36 and open the indicator lamp circuit. Therefore, in the dotted line position shown in FIG. 3, the heating element circuit is energized, but the indicator lamp circuit is open showing that the iron has been changed from a low temperature setting to a high temperature setting but that sole plate 10 has not reached the temperature of the higher setting. It will be realized that when the higher temperature setting is reached, the free end of bimetal 44 will curve downwardly carrying actuating lever 54 with it so that insulating rod 68 will be returned to a position intermediate the ends of contact arms 34 and 30 so that contacts 32 and 36 close and indicating lamp 86 is energized to show that sole plate 10 is at the temperature called for by the setting of shaft 75.

From the foregoing description of the structure and operation of a preferred embodiment of this invention it is apparent that a thermostatic switch has been provided which not only indicates the true temperature condition of the control device but also one which does so without providing erroneous indications or indicator flicker which would tend to mislead the user of the thermostatic device. Additionally, it is clear that the described structure is not only economical to manufacture but also is easily adjustable and reliable in operation.

As will be apparent to persons skilled in the art, various modifications and adaptations of the structure above described will become readily apparent without departure from the spirit and scope of the invention, the scope of which is defined in the appended claims.

I claim:
1. In an electrically heated device having a heating circuit and an indicator, a thermostatic switching arrangement comprising a first switch for controlling said heating circuit and a second switch for controlling said indicator, a temperature responsive bimetallic element having a fixed end secured in heat receiving relationship to the device and a free end, an actuating lever for operating said first switch, means pivotally mounting said lever on said free end of said bimetal, means on said lever and movable therewith for operating said second switch, and temperature selecting means for selectively varying the position of said lever relative to said pivot means to determine the temperature at which movement of said free end of said bimetallic element causes said lever and said means on said lever to operate said first and second switches, respectively.

2. A thermostatic switching arrangement as defined in claim 1 wherein said actuating lever is substantially straight and said pivot means is located intermediate the ends of said lever, one end of said lever being adapted to engage said first switch, the other end of said lever being engageable by said selecting means to vary the position of said rod relative to said pivot means.

3. A thermostatic switching arrangement as defined in claim 2 wherein said means on said actuating lever is an arm adapted to engage said second switch means so that the indicator is energized when said device is heated to a selected temperature and deenergized at any other temperature.

4. A thermostatic switching arrangement as defined in claim 3 further comprising calibrating means for varying the position of said arm relative to said lever to adjust the time at which said indicator is energized.

5. In an electrically heated iron having a sole plate, a heating circuit and an indicator circuit, a thermostatic switching arrangement comprising a first pair of contacts connected in series with said heating circuit, a second pair of contacts connected in series with said indicator circuit, a heat responsive bimetallic element having a fixed end secured to said sole plate and a free end, an actuating lever having one end thereof adapted to engage one of said first pair of contacts to open and close said heating circuit, mounting means fixed to said lever intermediate the ends thereof, means pivotally connecting said mounting means to said free end of said bimetallic element, an arm fixed to said lever and movable therewith for engaging one of said second pair of contacts to open and close said indicator circuit, and temperature selecting means adapted to engage the other end of said lever to vary selectively the position of said lever relative to the pivot means whereby said free end moves said lever and said pivot means so that said one end of said lever opens and closes said heating circuit to maintain the sole plate at a selected temperature and said arm closes said indicator circuit when said sole plate is at the selected temperature and opens it at any other temperature.

References Cited in the file of this patent

UNITED STATES PATENTS

| | | |
|---|---|---|
| 2,048,614 | Meyers | July 21, 1936 |
| 2,207,634 | Meyers et al. | July 9, 1940 |
| 2,417,161 | Hanner | Mar. 11, 1947 |
| 2,439,795 | Clark | Apr. 20, 1948 |
| 2,527,779 | Weiland | Oct. 31, 1950 |